(12) United States Patent
Radosav

(10) Patent No.: US 6,568,687 B2
(45) Date of Patent: May 27, 2003

(54) MECHANICAL FACE SEAL

(75) Inventor: Jon J. Radosav, Norridge, IL (US)

(73) Assignee: John Crane Inc., Morton Grove, IL (US)

( * ) Notice: Subject to any disclaimer, the term of this patent is extended or adjusted under 35 U.S.C. 154(b) by 0 days.

(21) Appl. No.: 09/934,462

(22) Filed: Aug. 21, 2001

(65) Prior Publication Data

US 2002/0047240 A1 Apr. 25, 2002

Related U.S. Application Data

(63) Continuation-in-part of application No. 09/643,045, filed on Aug. 21, 2000.

(51) Int. Cl.$^7$ ................................................ F16J 15/34
(52) U.S. Cl. ...................... 277/389; 277/369; 277/377; 277/379
(58) Field of Search ................................. 277/352, 358, 277/368, 369, 370, 377, 379

(56) References Cited

U.S. PATENT DOCUMENTS

| | | |
|---|---|---|
| 1,063,633 A | 6/1913 | Wilkinson |
| 1,561,426 A | 11/1925 | Fischbacher |
| 1,780,248 A | 11/1930 | Spreen |
| 2,000,341 A | 5/1935 | Larsh |
| 2,014,932 A | 9/1935 | Hallett |
| 2,167,669 A | 8/1939 | Molyneux |
| 2,189,197 A | 2/1940 | Cerny |
| 2,249,930 A | 7/1941 | Bailey |
| 2,267,994 A | 12/1941 | Reynolds |
| 2,299,590 A | 10/1942 | Reynolds |
| 2,322,834 A | 6/1943 | Dornhofer |
| 2,393,260 A | 1/1946 | Pardee |
| 2,446,243 A | 8/1948 | Reynolds |
| 2,465,546 A | 3/1949 | Marslek |
| 2,814,512 A | 11/1957 | Quinn et al. |
| 2,866,656 A | 12/1958 | Dobrosavljevic |
| 2,939,730 A | 6/1960 | Turpin |
| 2,994,547 A | 8/1961 | Dolhun et al. |
| 3,024,048 A | 3/1962 | Kobert |
| 3,061,318 A | 10/1962 | Laser |
| 3,131,943 A | 5/1964 | Mueller |
| 3,203,704 A | 8/1965 | Mueller |
| 3,332,692 A | 7/1967 | Mueller |
| 3,391,939 A | 7/1968 | Mueller |
| 3,391,941 A | 7/1968 | Mueller |
| 3,480,285 A | 11/1969 | Anderson |
| 3,507,504 A | 4/1970 | Donley |
| 3,575,424 A | 4/1971 | Taschenberg |

(List continued on next page.)

FOREIGN PATENT DOCUMENTS

| | | |
|---|---|---|
| AU | 144 296 | 11/1951 |
| GB | 6115 | of 1906 |
| GB | 308391 | 3/1929 |
| GB | 548051 | 9/1942 |
| GB | 799010 | 7/1958 |

Primary Examiner—J. J. Swann
Assistant Examiner—Matthew E. Rodgers
(74) Attorney, Agent, or Firm—Jenner & Block, LLC

(57) ABSTRACT

A mechanical end face seal comprising two relatively rotatable seal rings, a resilient bellows for providing a secondary seal between one seal ring and either a housing or a rotating shaft and a finger spring element nested in the bellows. The resilient bellows comprises an elastomeric material, such as molded rubber, and has a single convolution having a general cross-sectional shape of an inverted "Omega." The finger spring member comprises a plurality of generally "U" shaped spring fingers which provide the axial biasing force to urge the ring faces in sealing relation. In a preferred embodiment, the spring includes ferrules for providing radially inward force on a flange portion of each end of the bellows to maintain the secondary seal.

46 Claims, 7 Drawing Sheets

U.S. PATENT DOCUMENTS

| | | |
|---|---|---|
| 3,895,811 A | 7/1975 | Richard, Jr. et al. |
| 3,948,533 A | 4/1976 | Novosad |
| 4,275,889 A | 6/1981 | Butler et al. |
| 4,700,041 A | 10/1987 | Morita et al. |
| 4,754,981 A | 7/1988 | Burns |
| 4,779,876 A | 10/1988 | Novosad |
| 5,037,660 A | 8/1991 | Hirz et al. |
| 5,123,660 A | 6/1992 | Dahlheimer et al. |
| 5,163,692 A * | 11/1992 | Schofield .................... 277/153 |
| 5,199,720 A | 4/1993 | Radosav et al. |
| 5,226,787 A | 7/1993 | Freeman |
| 5,492,340 A | 2/1996 | Lederman |
| 5,676,382 A | 10/1997 | Dahlheimer |
| 5,947,479 A | 9/1999 | Ostrowski |
| 6,007,069 A | 12/1999 | Sadowski |

\* cited by examiner

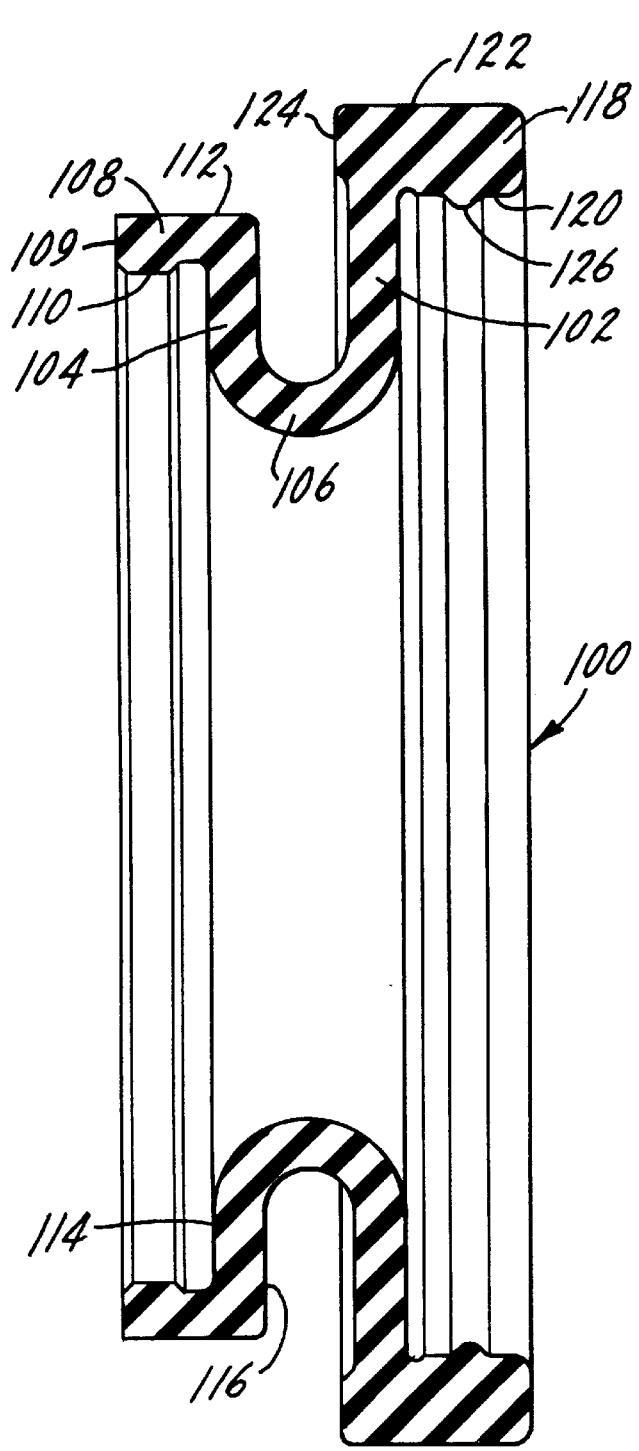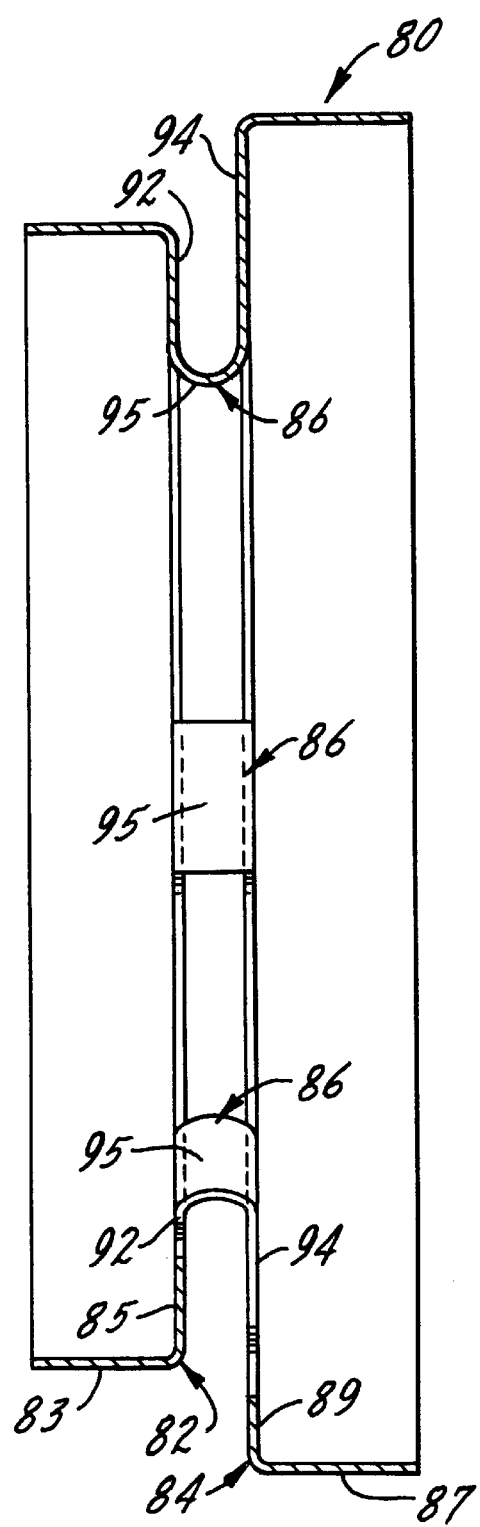

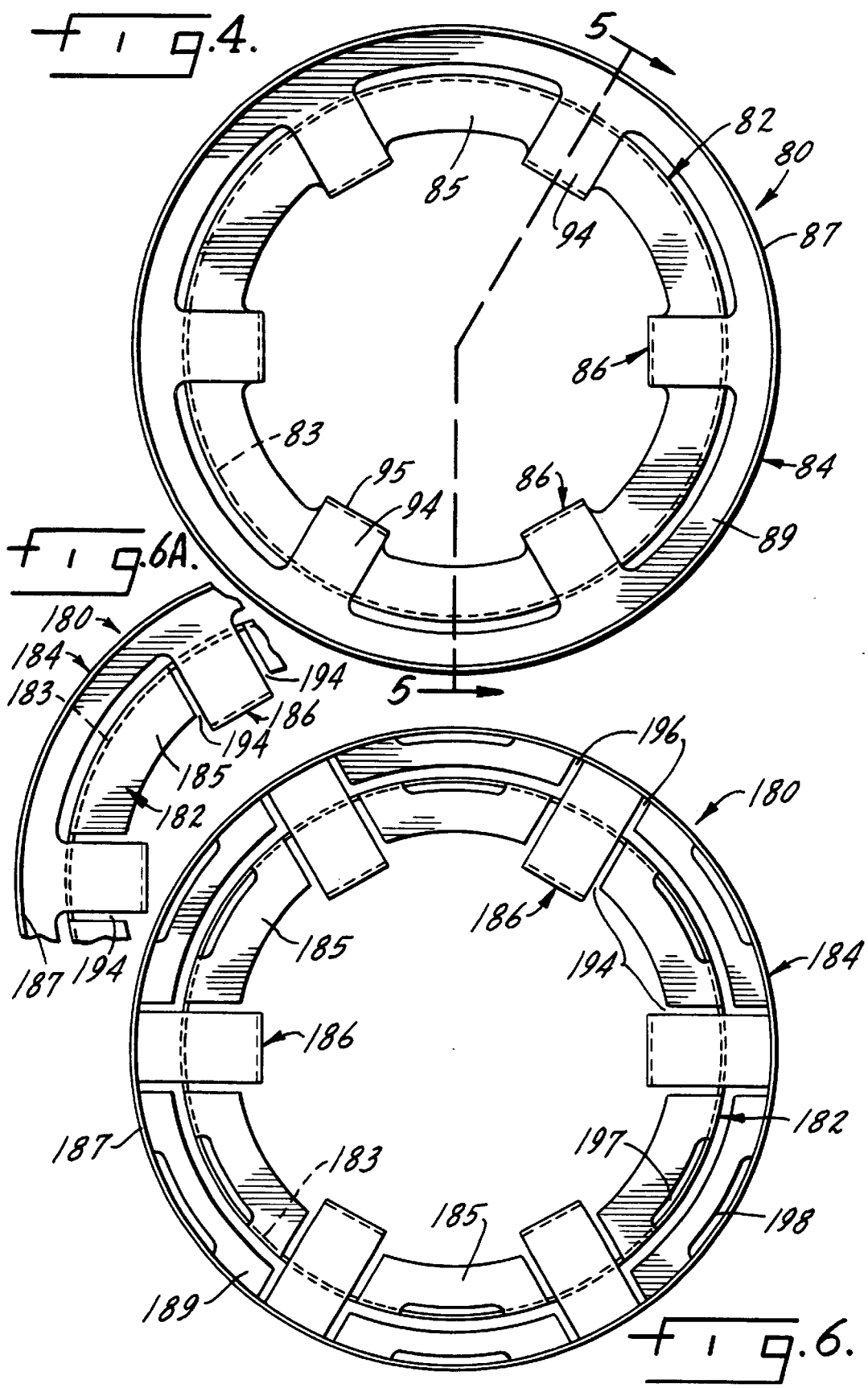

MECHANICAL FACE SEAL

This application is a continuation-in-part of copending application Ser. No. 09/643,045 filed on Aug. 21, 2000.

This invention relates to mechanical face seals which provide a fluid-tight seal between a housing and a rotatable shaft. More particularly, it relates to such seals that include a finger-type spring to provide an axial bias and a secondary seal formed of a rubber or elastomeric bellows.

BACKGROUND OF THE INVENTION

Seals of the general type are large volume, low cost and are particularly suitable for use in automotive water pumps. Other applications of such seals include other water pumps, such as marine bilge pumps, and pumps for various other liquids.

Seals currently in common use typically include a primary and mating ring defining relatively rotating sealing faces. These rings may be made of silicon carbide or carbon. A coil spring provides an axial bias, and an elastomeric or rubber bellows provides a secondary seal between the axially movable primary ring and its associated housing or shaft. Examples are found in U.S. Pat. Nos. 4,275,889; 4,779,876 and 5,199,719. Similar seals that have a different form of secondary seal or biasing means are shown in U.S. Pat. Nos. 4,754,981 and 5,947,479.

Bellows-type seals have enjoyed significant commercial success. Ongoing demand for improved productivity, reliability, durability and changing envelope requirements within the associated pump dictate continued effort for new developments. The present invention represents an advance in seal technology that addresses these needs.

SUMMARY OF THE INVENTION

The present invention is directed to a mechanical seal assembly which utilizes a finger-type spring to provide the axial load upon the axially movable seal ring. Also, a unique elastomeric bellows is provided which provides the secondary seal and includes a single convolution between its connection to the axially movable seal ring and its connection to the associated housing or shaft.

The invention comprises, in the broadest form, a mechanical end face seal assembly to provide a fluid tight seal between a housing defining a bore and a rotatable shaft extending through the bore, the seal assembly comprising an annular mating seal ring, an axially movable annular primary seal ring, the rings each having a seal face in facing relation to the seal face of the other ring to define a sealing interface therebetween, a resilient bellows in fluid-tight sealing relation to the primary ring and adapted to be in fluid-tight sealing relation to a housing or shaft, the bellows including an inboard web and an outboard web, a base connecting said webs to form a single convolution, a finger spring member adapted to urge the primary ring toward the mating seal ring, the finger spring member including a plurality of spring fingers adapted to be deformed on installation of said seal assembly between the housing and shaft, the finger spring being nested within the single convolution.

BRIEF DESCRIPTION OF THE DRAWINGS

FIG. 3 is a side sectional view of the secondary seal bellows of the embodiment of FIG. 1;

FIG. 4 is a plan view of the finger spring member of the embodiment of FIG. 1;

FIG. 5 is a side elevational sectional view of the finger spring member of the embodiment of FIG. 1, taken approximately along line 5—5 of FIG. 4;

FIG. 6 is a plan view of a form of finger spring member;

FIG. 6A is a fragmentary plan view of a form of finger spring member;

DETAILED DESCRIPTION OF THE PREFERRED EMBODIMENTS

Figure 1:
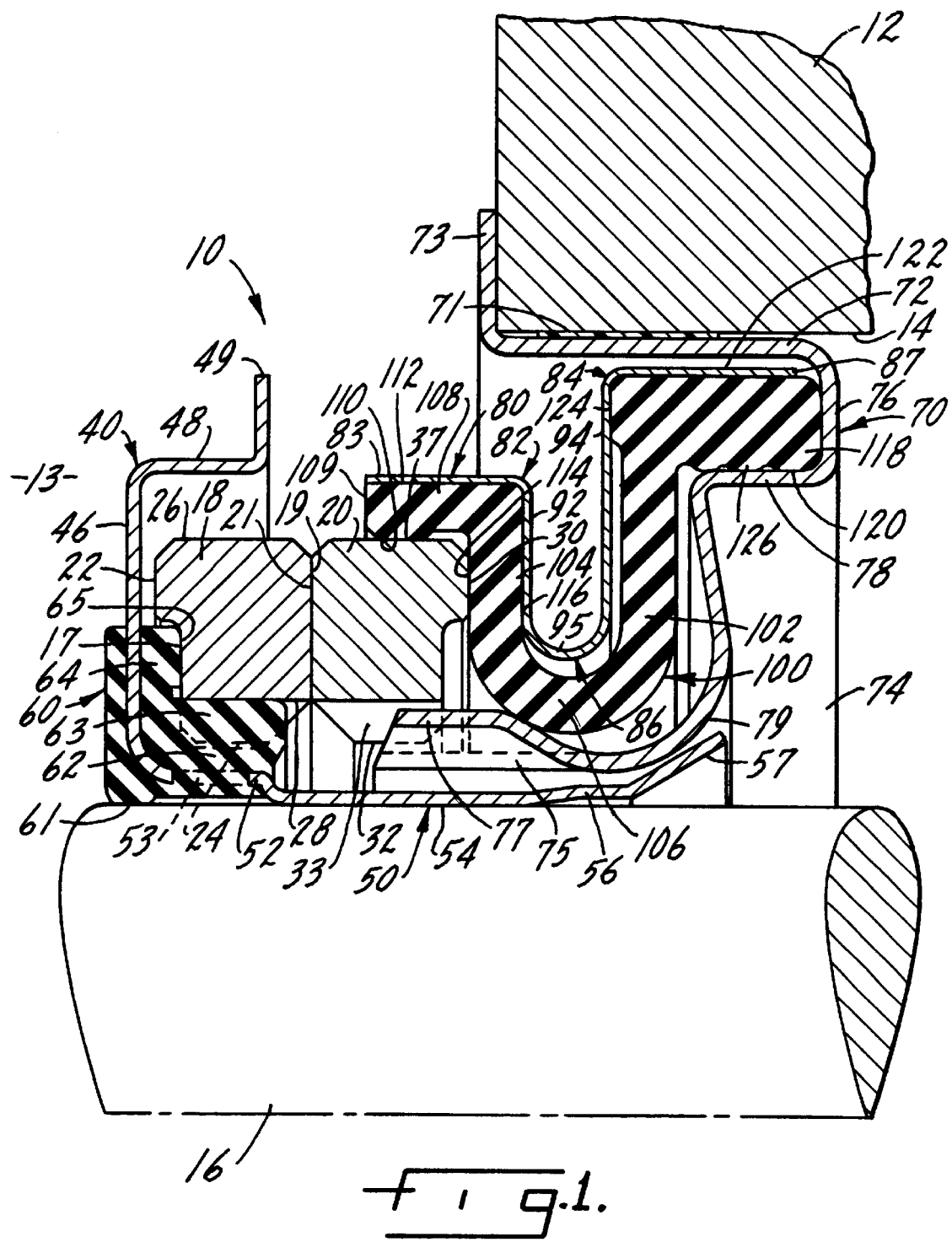
FIG. 1 is a sectional elevational view of a mechanical face seal assembly, prior to preloading, which embodies the present invention.

The accompanying drawings, FIGS. 1–5, illustrate one embodiment of a mechanical face seal assembly, generally designated 10, according to the present invention. Seal assembly 10 is installed between a housing 12 having a bore or passage 14 through which a relatively rotating shaft 16 extends. The seal assembly provides a fluid-tight seal between the housing 12 and the relatively rotating shaft 16.

The housing 12 may be a water pump or other device in which a shaft extends through an aperture in the surrounding housing. It is contemplated, however, that the seal assembly 10 could have application in a wide variety of pumps and other devices, particularly, pumps with small diameter shafts. The fluid may be water, or water based, or even oil.

Figure 2:
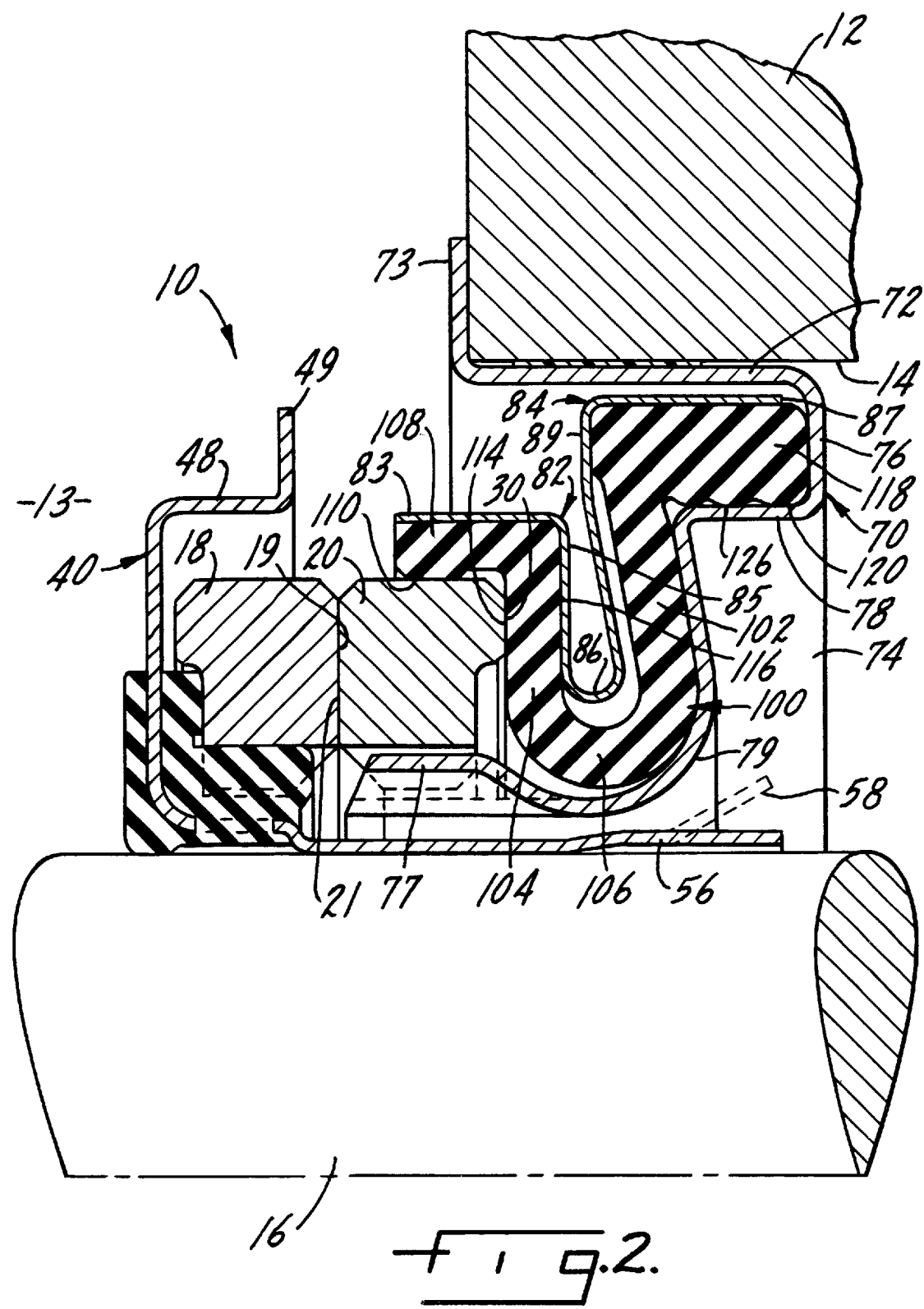
FIG. 2 is a sectional elevational view of the mechanical face seal assembly, shown in FIG. 1, in its installed position and preloaded within an illustrative pump.

The housing of the embodiment illustrated in FIGS. 1 and 2 is part of a pump, such as a water or other liquid pump, in which an impeller (not shown) rotatable by the shaft 16 elevates the pressure of the liquid to be sealed. FIG. 1 shows the seal elements installed on a shaft 16 within a housing 14, but prior to loading the seal rings to a predetermined minimum installed working height, as will be explained. FIG. 2 shows a similar seal in the working position with the spring preloaded. As shown in FIG. 1, the liquid is contained in space 13 inboard the housing 12, and the impeller would be disposed to the left side of seal assembly 10. In describing the illustrated embodiments, the term "inboard" is used to make reference to the pressure side of the pump and the term "outboard" is used to refer to the ambient environment external to the pump, i.e., the atmosphere. The term "radially inwardly" means toward shaft and "radially outward" means away from the shaft.

Though shown in cross-section in FIGS. 1, 2, 3 and 5, it should be readily apparent that the seal assembly components are annular, as are the various surfaces of these components which are described in detail.

As illustrated in FIG. 1, each seal assembly includes a pair of annular sealing rings including mating ring 18 and primary ring 20 associated respectively with shaft 16 and housing 12. These rings respectively define mating sealing faces 19 and 21 which are in facing, sealing relation and define a seal interface.

The sealing rings 18 and 20 are shown as contained in carriers comprising a cylindrical sleeve 40 and an annular shell or retainer 70. Sleeve 40 includes tubular elongate portion 50 arranged to attach to the shaft 16 to secure the ring 18 for rotation with the shaft 16. Retainer 70 includes axially extending cylindrical outer wall portion 72 arranged to connect the ring 20 to associated housing 12.

In this embodiment, these latter elements are configured to form a cartridge or unitary seal assembly which may be installed into position as a unitary component. It should be understood, however, the invention does not require that the seal assembly be unitized. Moreover, it is not necessary in every aspect of the invention that a sleeve and retainer be incorporated in the seal assembly. The operative components may be otherwise attached to the housing and shaft in an alternate manner with the sleeve or retainer or both components eliminated.

Primary ring 20 is axially movable. It is biased toward ring 18 by spring 80, shown in detail in FIGS. 4 and 5, which is a finger-type spring. An elastomeric bellows 100, shown in detail in FIG. 3, provides a fluid-tight secondary seal between ring 20 and the retainer 70. It also permits axial movement of the ring 20 without affecting the secondary seal between the ring 20 and retainer 70.

Referring to FIG. 1, mating ring 18 is fixed axially relative to shaft 16 and housing 12. It includes an annular radial surface 22 spaced axially inboard from radial sealing face 19, and includes a counterbore 17. It also includes an inner cylindrical surface 24 having a larger diameter than the diameter of the tubular elongate portion 50. The inner cylindrical surface 24 is provided with drive notches 28 equally spaced about the inner periphery of the ring 20. It should be noted that the axially movable primary ring 20 could be associated with shaft 16, and mating ring 18 could be fixed to housing 12.

Primary ring 20 includes outboard radial surface 30, spaced outboard of seal face 21. Ring 20 also includes an inner axial cylindrical surface 32 having a diameter larger than the diameter of the tubular elongate portion 50 of sleeve 40 to permit axial movement of the ring. Surface 32 is provided with a plurality of notches 33. Primary ring 20 includes axially extending cylindrical surface 37 that defines its radially outer periphery.

Referring to FIG. 1, shaft sleeve 40 supports mating ring 18 upon shaft 16. Shaft sleeve 40 includes a tubular elongate portion 50 defining inboard enlarged portion 52, shaft engaging portion 54 and outboard enlarged portion 56. Outboard enlarged portion 56 is sized to facilitate placement of the seal assembly upon shaft 16 during installation. The axial end of outboard enlarged portion 56 is preferably swaged outwardly after assembly to retain the curved wall portion 79 of retainer 70, and thus retain the seal as a cartridge before installation. Alternatively, outboard enlarged portion 56 may include a plurality of tabs 57 (as shown in phantom in FIG. 2) to maintain the sleeve 40 and retainer 70 as a unitized seal assembly until the seal 10 is installed. Inboard enlarged portion 52 defines a plurality of holes 53 for purposes that will be explained.

Shaft sleeve 40 defines a seal ring receptacle comprising flange 46 which is radial. Shaft sleeve 40 further comprises an annular cylindrical wall 48 and a radial wall 49. Wall 48 is of a diameter larger than outer cylindrical surface 26 of ring 18. Walls 48 and 49 of sleeve 40 provide protection for the seal ring 18 against damage from contact with other objects, such as other similar seal assemblies which may come in contact with each other during handling or storage prior to installation. These wall portions may be eliminated or modified in shape without departing from the principles of the invention.

A resilient elastomeric support and secondary seal 60 is molded onto the inboard enlarged portion 52 of tubular elongate portion 50. It is mechanically secured to the sleeve 40 during the molding process at holes 53 in the inboard enlarged portion 52.

Molded support and secondary seal 60 defines an inboard annular bead 61 which engages the outer surface of shaft 16 to provide a sealed relationship between the shaft 16 and the sleeve 40. Bead 61 also assists the metal to metal interference fit between shaft engaging portion 54 of tubular elongate portion 50 and shaft 16, so as to maintain the axial position of sleeve 40 relative to shaft 16. Bead 61 becomes compressed against the shaft, as shown in FIG. 1, when installed.

Elastomeric support and secondary seal 60 defines a ring seal and drive portion radially outward of enlarged inboard portion 52 of sleeve 40. It includes axial drive portion 62 that extends between enlarged inboard portion 52 and inner cylindrical surface 24 of seal ring 18. Portion 62 defines drive lugs 63 disposed within drive notches 28 formed in inner cylindrical surface 24. This relationship retains the annular seal ring 18 against rotation relative to sleeve 40.

Elastomeric support and secondary seal 60 further defines an integrally formed annular seal portion 64 compressed between radial wall 46 of sleeve 40 and mating ring 18. It defines radial sealing surface 65 in fluid tight contact with ring 18 within counterbore 17.

The primary ring 20 is supported relative to housing 12 by annular stamped metal primary ring retainer 70. The retainer 70 comprises axially extending cylindrical outer wall portion 72, a radial rim 73, a radially extending, annular, outboard portion 74 and an axially extending generally cylindrical inner wall portion 75.

The axially extending cylindrical outer wall portion 72 has a predetermined diameter which is received in the bore 14 of housing 12. the housing bore 14 is sized such that the cylindrical portion 72 may be press-fit into the bore 14 to create a fluid-tight relationship between the retainer 70 and the housing 12. A layer of latex or other appropriate material may be applied to the outer diameter surface of wall 71 to ensure a fluid-tight seal between the retainer 70 and the housing 12. The radial rim 73 seats against a radial surface of the wall of the housing 12 to provide a stop to precisely axially position the retainer 70 relative to the housing 2 and to the shaft 16.

The generally radial outboard portion 74 defines a radial annular wall portion 76 connecting axially extending cylindrical outer wall portion 72 with an axially extending cylindrical seat wall portion 78. Seat wall portion 78 defines a seat to receive a portion of a bellows 100 in fluid-tight relation, as will be explained.

Generally radial outboard portion 74 further defines a generally radially extending curved wall portion 79. Radially extending, curved wall portion 79 connects with axially extending cylindrical inner wall portion 75, sized to be of a diameter larger than tubular elongate portion 50 to permit relative axial movement between sleeve 40 and retainer 70 on installation. Detents 77 formed in cylindrical inner wall portion 75 engage notches 33 in primary ring 20. The inner axial surface 32 of primary ring 20 is of a diameter larger than axially extending cylindrical inner wall portion 75 to permit axial movement of primary ring 20 relative to retainer 70. The inter-engagement between notches 33 and detents 77 precludes rotation of the primary ring 20 relative to the retainer 70 which is, in turn, fixed to the housing 12.

A secondary seal between the primary ring 20 and retainer 70 is provided by resilient, elastomeric bellows 100. The bellows' cross-section is of a generally inverted "Omega" shape with outboard web 102 somewhat longer than inboard web 104. Web portions 102 and 104 are joined by a radially inner base portion 106 to form a single convolution.

At its radially outer end, inboard web 104 includes an axially extending annular flange 108. Flange 108 includes an axially extending cylindrical surface 110 in fluid-tight sealing engagement with axial cylindrical surface 37 of primary ring 20. It also includes a radially outboard cylindrical surface 112 in contact with finger spring 80, as will be explained in further detail.

Web 104 includes a radial inboard surface 114 in contact with outboard radial surface 30 of primary ring 20. It also includes a radial outboard surface 116 in contact with finger spring 80.

Outboard web 102 includes an axially extending flange 118. Flange 118 includes an axially extending, inner diameter cylindrical surface 120 including an inner directed bead 126 in fluid-tight sealing engagement with axial cylindrical seat wall 78 of retainer 70. It also includes a radially outer axially extending surface 122 and a radially extending annular surface 124, which contact finger spring 80.

Referring now to FIGS. 1, 2, 4 and 5, finger spring member 80 nested within the single convolution defined by bellows 100 provides the axial biasing force that causes the primary ring 20 to be urged toward mating ring 18. It includes a ferrule portion 82 associated with the flange 108 at primary ring 20, a ferrule portion 84 associated with the flange 118 at retainer 70. A plurality of spring fingers 86 connect ferrule portions 82 and 84. These spring fingers 86 are generally of a "U-shaped" cross-section, with one leg longer than the other.

Ferrule portion 82 includes a generally cylindrical axially extending portion 83 overlying web 108 at surface 112 and a generally radially extending annular portion 85 adjacent radial outboard surface 116 of web 104.

Ferrule portion 84 includes a generally cylindrical, axially extending portion 87 overlying web 118 at surface 122 and a generally radially extending annular portion 89 adjacent radial inboard surface 124 of web 102.

Each spring finger 86 includes a relatively short radial leg portion 92 connected to ferrule 82 at radial annular portion 85 and a relatively long radial leg portion 94 connected to ferrule 84 at radial annular portion 89. The leg portions are joined at a radially inner bend portion 95.

At its working height, shown in FIG. 2, the seal assembly components are positioned with respect to the housing 12 and shaft 16 such that the spring fingers 86 are deformed by movement of the ferrule portions 82,84 toward each other so that the radial annular portion 85 of ferrule 82 is brought toward the radial annular portion 89 of ferrule 84, thus placing the finger spring 80 in bending. At this working height, the restoring force from bending of fingers 86 causes the radial annular portion 85 to be urged away from the radial annular portion 89, thereby also axially biasing the axially extending annular flange 108 and radial outboard surface 116 of inboard radial web 104 inboard from the outboard radial web 102. The close contact between inboard surface 114 of inboard web 104 and the radial wall 30 of primary ring 20 causes the primary ring 20 to be biased toward mating ring 18, thus tending to bring the sealing faces 19 and 21 into contact.

In an operational embodiment for a shaft having a 12 millimeter diameter, the load on the spring is caused by a working height compression of approximately 1 millimeter.

At the working height, the spring 80 and the elastomeric bellows 100 causes the base 106 of bellows 100 to shift in position within the retainer 70 so that the bellows comes into contact with the radially extending curved wall portion 79. This is the normal seat position of the convolution of elastomeric bellows 100, which still permits some axial motion of the primary seal ring 20.

One feature provided by this particular arrangement of the inventive seal embodiment 10 is minimizing the axial and other loads on the bellows. For example, as the water pump begins operation, the fluid inboard of the elastomeric bellows 100 becomes pressurized to a pressure exceeding the ambient pressure outboard of the seal. This pressure tends to push at the walls, and especially at the longer radially extending surface of inner radial web 104 and of outer radial web 102 and thereby tending to deform the shape of the elastomeric bellows.

One feature provided in this embodiment is that the retainer 70, including the radially extending curved wall portion 79, provide both axial and radial support to the elastomeric bellows 100, which, at its central base 106 and outboard web 104, takes the shape provided by the retainer 70. The pressure created by the pump impeller therefore cannot deform the annular shape of the elastomeric bellows and thereby avoids opening of undesirable leak paths through the secondary seal, for example, by deforming the squeeze at the axially extending flange 118.

Although some incidental load on the seal ring 20 may be provided by the bellows 100, one feature of the arrangement is to isolate the bellows 100 from the axial forces acting on the seal. Thus, the primary function of the bellows 100 is to provide a secondary seal between the retainer 70 and the housing 12 and seal ring 20.

Providing a consistent and efficient secondary seal to the housing 12 is achieved through squeezing the bellows flange 118 within the cup-shaped receptacle defined by the retainer walls 72, 76, 78. Maintaining such a secondary seal creates special difficulties because of the pressure differential across the elastomeric bellows seal 100 produced during operation of the pump, and also due to the continual vibrational forces created during rotation of the shaft 16 by a motor or other device (not shown), disposed outboard of seal 110.

One feature of the present invention that facilitates in maintaining the secondary seal at the outboard end is an annular bead 126 centrally disposed on the axially extending surface 120 of flange 118. As is best illustrated in FIG. 3, the bead 126 extends inwardly of the planar axially extending surface 120. As the flange 118 is fit into the retainer 70, the bead 126 becomes squeezed against the axially extending cylindrical seat wall portion 78, and thereby creating a stronger interference fit between the flange 118 and retainer 70. At the inboard end of bellows 100, a secondary seal is formed by flange 108 surrounding seal ring 20.

Ferrule 82 is sized such that it applies a compressive force to axially extending annular flange 108 of web 104 to establish a fluid-tight relationship between the contacting surface of the ferrule 82 and flange 108 and the contacting surfaces of the flange 108 and primary ring 20. Ferrule 84 is sized such that it applies a compressive force to axially extending annular flange 118 of web 102 to establish a fluid-tight relationship between the contacting surfaces of ferrule 84 and flange 118.

The radial connection of cylindrical axial portion 83 of the finger spring 80 produces a radially inward force, which, together with the fluid pressure of the pumped fluid, maintains the secondary seal of the flange 108, which is pressed against the primary seal ring 18. The radially inwardly directed force of the cylindrical axial portion 83 is capable of maintaining a static seal between axially extending cylindrical surface 110 of flange 108 and outer diameter axial cylindrical surface 37 of the seal ring 20. For better sealing capability, cylindrical surface 110 presents a seal at the end of a tapered bead-like inner surface of flange 108, as shown, which also is squeezed radially inwardly to maintain the secondary seal against seal ring 20. An incidental axial force on the radially exposed wall 109 of flange 108 is countered by the corresponding axially directed opposite pressure force on radially outboard surface 116 and by the spring force of spring 80 acting axially on the flange 108.

Proper loading of the seal 10, for example, at a working height axial compression of about 1 mm for a seal intended for use with a 12 mm shaft, should ensure that there is no contact between the two radial annular portions 85,89 of ferrules 82,84. A seal for a 12 mm shaft size typically may have a "free" height, that is before preloading, as shown in FIG. 1, of about 14.2 mm. After preloading, with conventional instruments that measure the distance between the axial ends of seal 10, the typical minimum installed height may be about 13.1 mm.

Of course, axial motion in the direction tending to further bend the spring fingers 86 causes the spring force to increase, thus tending to bias the seal ring 20 against mating ring 18 even more strongly until the optimal load is achieved. Axial motion beyond a certain point is impeded by the contact of the radial annular portions 85,89, but such contact must be avoided to prevent an undesirable increase on the load placed on seal ring 20. The typical separation between radial annular portions 85,89, under proper loading conditions, will be approximately about 0.5 to 1.0 mm, as shown in FIG. 2.

It should be noted that in the preloaded state, shown in FIG. 2, the leg of spring finger 86 which connects to ferrule 84 is subject to greater axial deflection than the leg connected to ferrule 82. This greater deflection results from the shape and configuration of the web 102, which provides for a separation between the spring finger 86 and wall surface of web 102. This is a preferred configuration because it is desirable to maintain the shape and configuration as close to square as possible in order to maintain the support of seal ring 20 and the fluid-tight secondary seal thereagainst. The final configuration of the spring 80 maybe formed by one or several stamping steps prior to final assembly. Special customized stampings are ordinarily required to form the spring 80, and may be available from commercial precision stamping operations, such as American Engineered Components of Brighton, Mass., and Carla Place, N.Y. The finger spring member 80 is made of stainless steel and is preferably formed as a single integral component. The finger spring member 80 alternatively may be made as separate components riveted together or otherwise fastened to each other.

In a working embodiment, the materials of the elements can be standard sealing materials. Preferably, the mating ring 18 is made from silicon carbide (SiC) and the primary ring 20 may comprise either silicon carbide as shown in FIG. 2 or a standard carbon ring, as shown in FIG. 1. The bellows material is resilient and preferably an elastomer such as molded rubber and the springs 80, including spring fingers 86, are stainless steel or spring steel. The sleeve 40 and retainer 70 are also stainless steel.

Dimensions of the elements may vary depending on the shaft size for which the seal 10 is intended. As an example, for a shaft size of 12 millimeters, the spring 80 may comprise a sheet of 301 or 316L stainless steel spring having a thickness of approximately 0.10 to 0.50 millimeters, with a preferable thickness of 0.15 millimeter. The dimensions, and especially the load provided in the free height state, may be critical to the operation of the seal. It is of course important that the dimension of the annular elastomeric bellows 100 match the dimensions of the retainer 70 and the seal ring 20 so that the elastomeric portions may be compressed to form the appropriate secondary seals.

An alternative configuration of a spring 180 is shown in FIG. 6, in which the ferrule 182,184 provides for additional flexibility in the seal. As shown in FIG. 6, the radial and axial intersection of the spring members 180 may be modified to reduce stiffness in the spring force provided by finger spring member 180. As shown in FIG. 6, various cuts and gaps in the web of the spring member 180 may be made, which increase the flexibility of the spring fingers.

Radially extending surfaces 185 and 189 of ferrules 182 and 184 may be cut adjacent the spring elements 186 so that the spring element connections to the ferrules 182, 184 are directly to the corresponding cylindrical axial portions 183, 187 respectively. A gap 194, provided between spring element 186 and radial portion 185 and gap 196, may be provided between spring element 186 and radial annular portion 189 so that the spring elements extend continuously to cylindrical wall portions 183, so that the spring elements 186 can flex relative to the respective ferrules 182,184 independently of any support derived from the radially extending annular members 185 and 189, respectively.

Additional flexibility may be provided, if desired, by making additional cutouts in the ferrules at the corners where the axial cylindrical portions 183, 187 connect to the respective radial annular portions 185, 189. For example, cutouts 197 in the corners of ferrule 182 and cutouts 198 in the corners of ferrule 184 provide flexibility in the movement of the ferrule elements relative to each other and to the web of the adjacent elastomeric bellows 100, without detracting in any way from the structural integrity of the finger spring 186. Cutouts 197,198 may take any shape, but, as shown, they comprise elongated ovals which follow the folds, created during the stamping process, that comprise the corners between the axial and radial portions of ferrules 182,184.

FIG. 6A shows a form of spring member 180. Radial portion 185 of ferrule 182 is cut to define radial gaps 194 between spring finger element 186 and radial portion 185. The spring finger is connected to cylindrical annular portion 183 of ferrule 182. Spring finger leg 194 of each spring finger 186 is connected to radial annular portion 189 of ferrule 184.

In the illustration of FIG. 6A, the spring finger legs 192, because of gaps 194, are longer, and somewhat more flexible than the inboard short legs 92 of the embodiment of FIGS. 1–4. The spring rate of the finger spring 180 of this illustration is lower than the spring rate of the finger spring 80.

FIGS. 7–12 illustrate another embodiment of a mechanical face seal assembly according the present invention.

Figure 7:
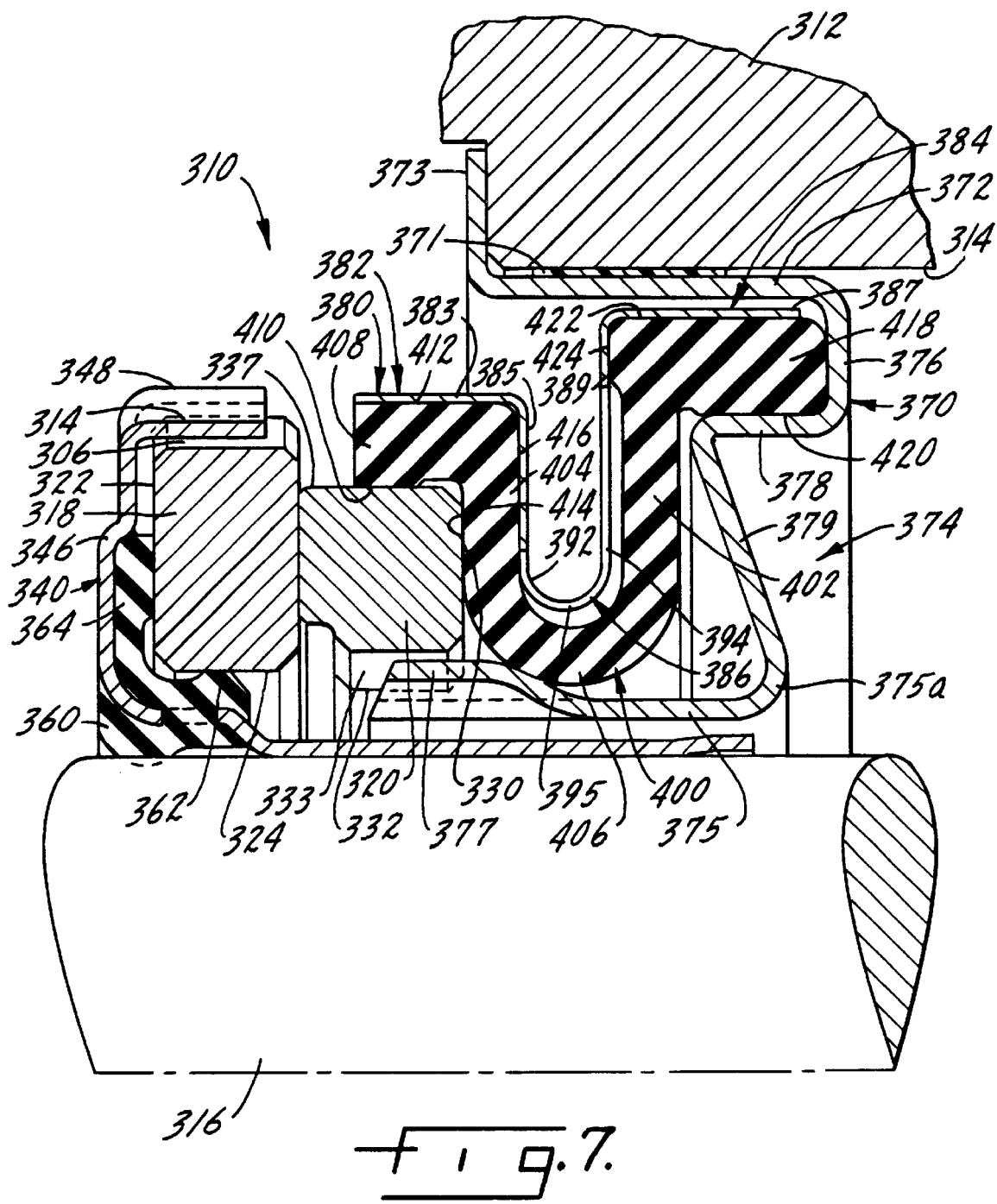
FIG. 7 is a sectional elevational view of another embodiment of a mechanical face seal assembly, prior to preloading.
Figure 12:
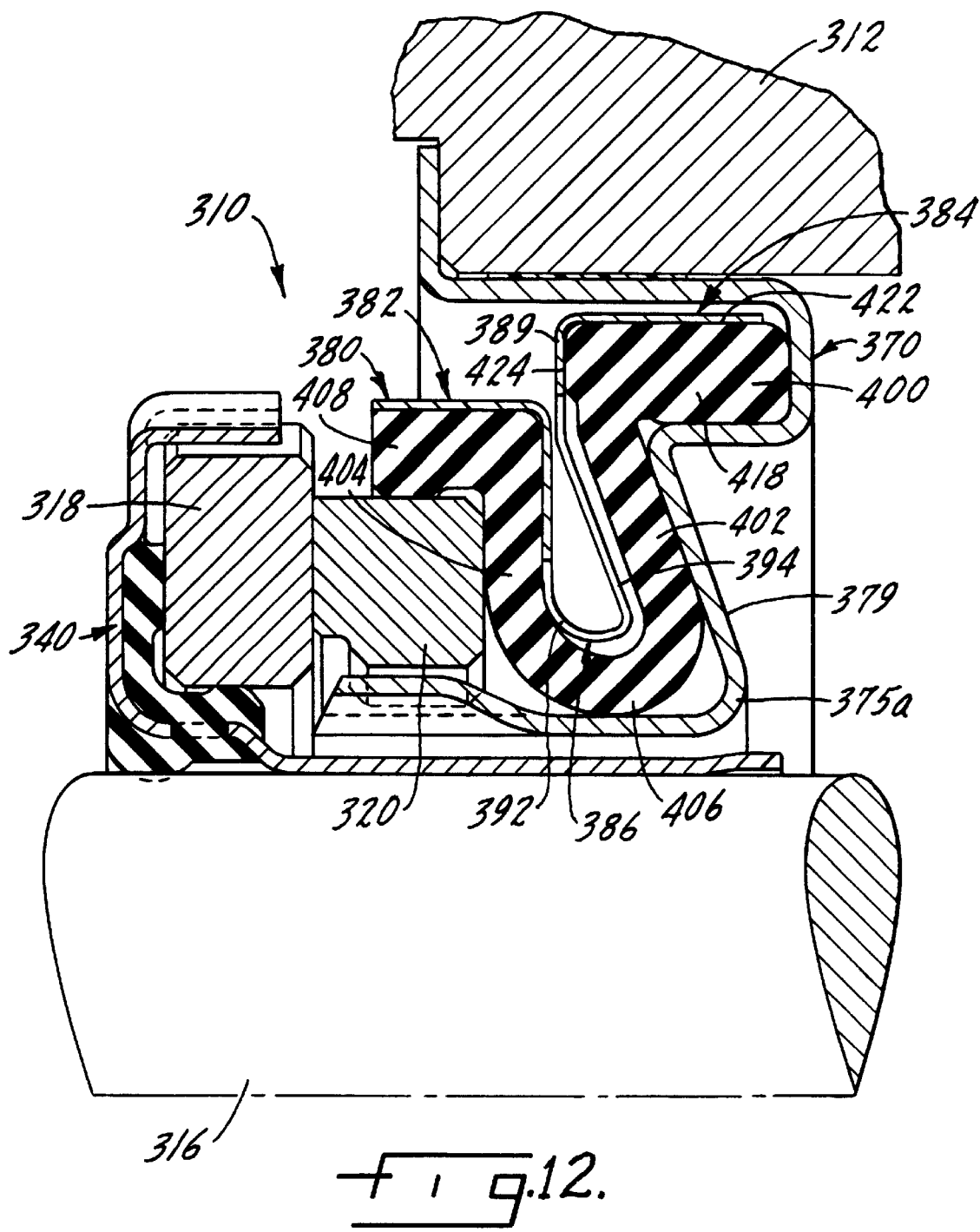
FIG. 12 is a sectional elevational view of the mechanical face seal assembly, shown in FIG. 7, in its installed position and preloaded.

FIG. 7 illustrates the mechanical face seal assembly 310 at its free height. FIG. 12 shows the seal assembly at its installed or working height. The mechanical face seal assembly 310 includes a mating ring 318 and a primary ring 320, a sleeve 340, retainer 370, finger spring 380 and bellows 400.

The primary ring 320 of this embodiment is identical to the primary ring 20 of the first embodiment. Primary ring 320 includes outboard radial surface 330 and an outer axially extending cylindrical surface 337. It also includes inner axial cylindrical surface 332 defining a plurality of axial notches 333.

The mating ring 318 of this embodiment is similar to the mating ring 18 of the first embodiment. It includes an annular radial back surface 322. it also includes an inner annular cylindrical surface 324.

Figures 8, 9:
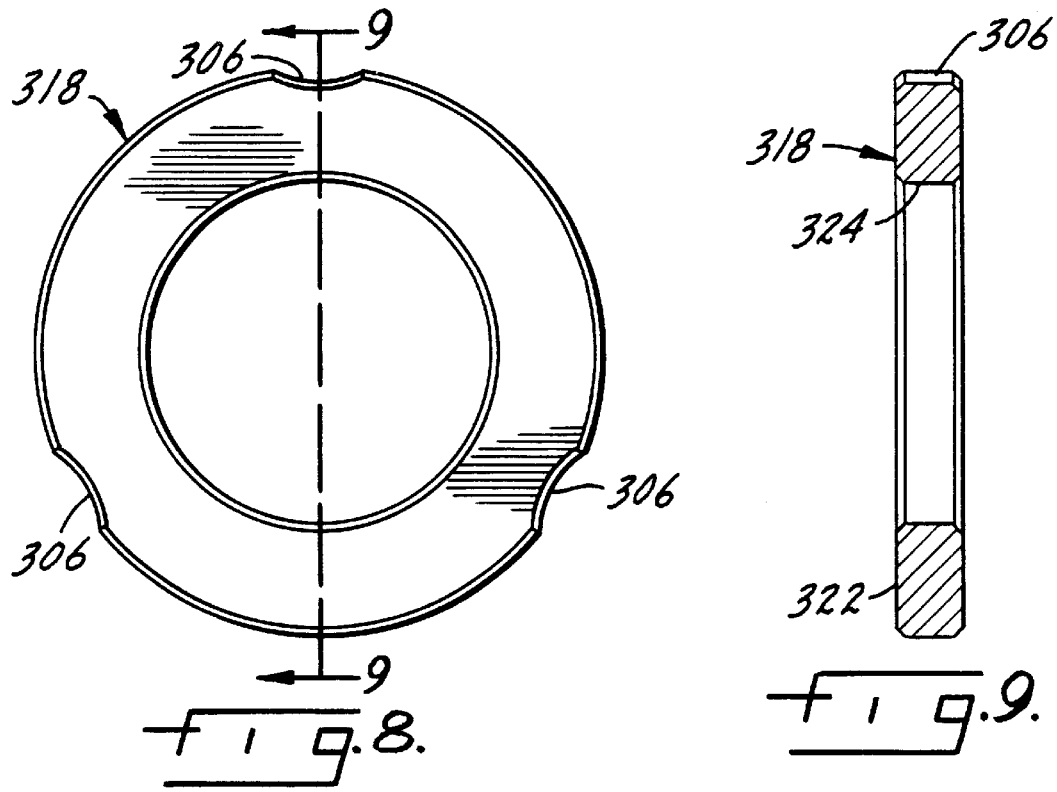
FIG. 8 is a plan view of the mating ring of the embodiment of FIG. 7.
FIG. 9 is a side elevational sectional view of the mating ring of the embodiment of FIG. 7, taken approximately along line 9—9 of FIG. 8.

Mating ring 320 does not include drive notches such as notches 28 of the embodiment of FIGS. 1–5. It does includes three, approximately equally spaced, drive notches 306 defined on the radially outer surface of the mating ring 318, as illustrated in FIGS. 8 and 9.

Figures 10, 11:
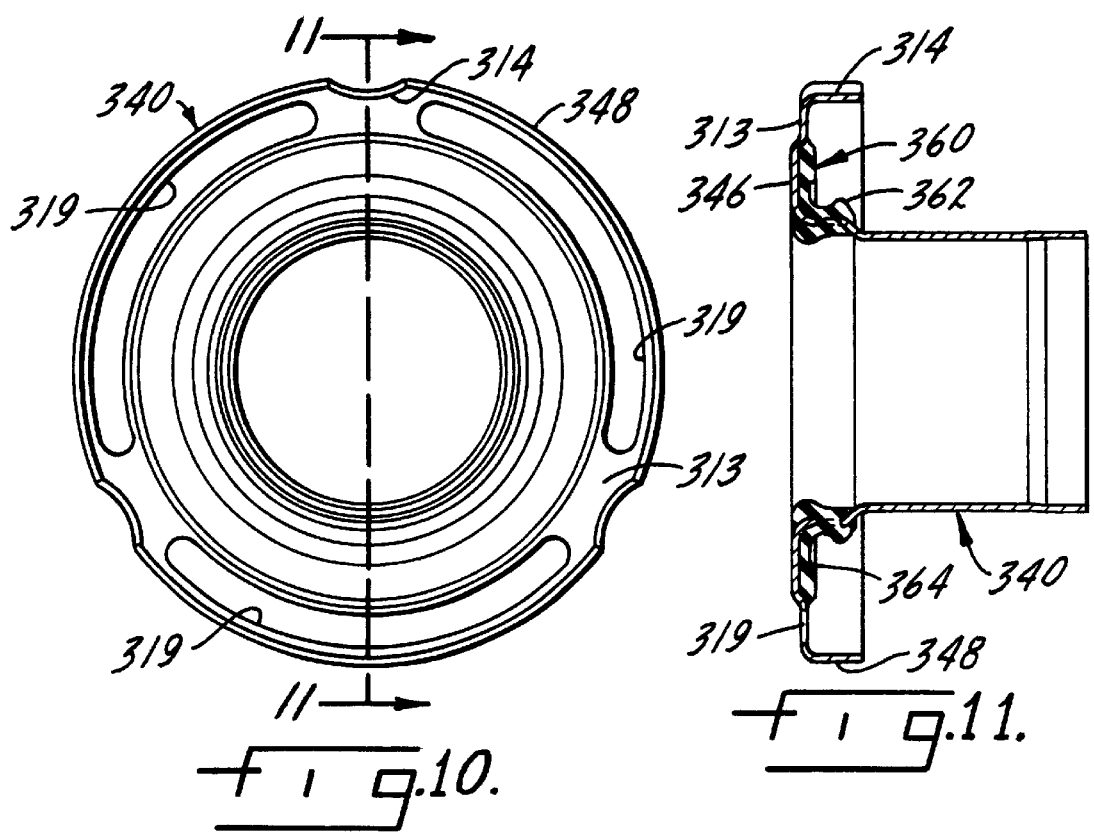
FIG. 10 is a plan view of the sleeve of the embodiment of FIG. 7.
FIG. 11 is a side elevational sectional view of the sleeve of the embodiment of FIG. 7, taken approximately along line 11—11 of FIG. 10.

The rings 318 and 320 are contained in carriers comprising cylindrical sleeve 340 and annular shell or retainer 370. The sleeve 340 of this embodiment illustrated in FIGS. 10 and 11 is similar to the sleeve 40 of the first embodiment. It includes radial flange 346 and outer cylindrical wall 348. Three, approximately equally spaced, radially inwardly dents are defined in the radially outer cylindrical wall 348 of the sleeve 340. Since the sleeve 340 is formed of a thin sheet of metal, a corresponding radially inwardly directed protrusions 314 are formed in the annular cylindrical wall 348. The protrusions 314 are located such that they can be situated directly aligned with the drive notches 306 of the mating ring 318. The protrusions 314 are sized such that they can be received within the drive notches 306 of the mating ring 318. The combination of the protrusions 314 of the sleeve 340 within the drive notches 306 of the mating ring 318 allows the sleeve 340 to positively engage the mating ring 318 to drive the mating ring 318 with the sleeve 340 and the shaft 316 to which the sleeve 340 is attached.

Another difference between the sleeve 340 of this embodiment and the sleeve 40 of the first embodiment is that the sleeve 340 has a three slots 319 defined in the radially outwardly extending portion of the flange 346. The slots 319, best seen in FIGS. 10 and 11, are approximately equally spaced and are located between the protrusions 314. The slots 319 of the sleeve 340 permit liquid circulation through the sleeve 340. The particular number of slots is not considered critical. If necessary, the radial portion of flange 340 could include six or eight slots separated by webs such as webs 313 shown in FIG. 10.

A resilient elastomeric support and secondary seal 360 is molded onto the radially inward and inboard portion of the sleeve 340. The support and secondary seal 360 of this embodiment includes support and secondary seal elements. Elastomeric support and secondary seal 360 defines an integrally formed annular seal portion 364 compressed between radial wall 349 and back radial surface 322 of mating ring 318. An annular seat 362 is positioned within ring 318 and provides radial support of the mating ring 318 upon inner annular cylindrical surface 324.

The primary ring 320 is supported relative to housing 312 by annular stamped metal primary ring retainer 370. The retainer 370 comprises axially extending cylindrical outer wall portion 372, a radial rim 373, a radially extending, annular, outboard portion 374 and an axially extending generally cylindrical inner wall portion 375.

The axially extending cylindrical outer wall portion 372 has a predetermined diameter which is received in the bore 314 of housing 312. The housing bore 314 is sized such that the cylindrical portion 372 may be press-fit into the bore 314 to create a fluid-tight relationship between the retainer 370 and the housing 312. A layer of latex or other appropriate material 371 may be applied to the outer diameter surface of wall 372 to ensure a fluid-tight seal between the retainer 370 and the housing 312. The radial rim 373 seats against a radial surface of the wall of the housing 312 to provide a stop to precisely axially position the retainer 370 relative to the housing 312 and to the shaft 316.

The generally radial outboard portion 374 defines a radial annular wall portion 376 connecting axially extending cylindrical outer wall portion 372 with an axially extending cylindrical seat wall portion 378. Seat wall portion 378 defines a seat to receive a portion of a bellows 400 in fluid-tight relation.

Generally radial outboard portion 374 further defines a generally radially extending conical wall portion 379. Conical wall 379 is convex on its outboard surface and concave on its inboard surface adjacent bellows 400.

A curved wall transition portion 375a connects the conical wall portion 379 to cylindrical wall portion 375. The cylindrical wall portion 375 extends for a given distance axially and defines detents 377 which engage notches 333 on primary ring 320 to retain primary ring 320 from rotation relative to sleeve 370, yet permit axial movement.

Cylindrical wall portion 375 is located radially inwardly of the outer surface of the inner base portion 406 of the bellows 400. The conical wall portion 379, the curved transition wall portion 375a and the cylindrical wall portion 375 are located outboard of the inner base 406 of the bellows 400 when the seal assembly is at its free height, as illustrated in FIG. 7.

As with the first embodiment, a secondary seal between the primary ring 320 and the retainer 370 is provided by resilient elastomeric bellows 400. The bellows 400 is identical to the bellows 100 of the first embodiment. The cross-section of bellows 400 is of a generally inverted "Omega" shape with outboard web 402 somewhat longer than inboard web 404. Web portions 402 and 404 are joined by a radially inner base portion 406 to form a single convolution.

At its radially outer end, inboard web 404 includes an axially extending annular flange 408. Flange 408 includes an axially extending cylindrical surface 410 in fluid-tight sealing engagement with outer axial cylindrical surface 337 of primary ring 320. It also includes a radially outboard cylindrical surface 412 in contact with ferrule 382 of finger spring 380.

Web 404 includes a radial inboard surface 414 in contact with outboard radial surface 330 of primary ring 320. It also includes a radial outboard surface 416 in contact with finger spring 380.

Outboard web 402 includes an axially extending flange 418. Flange 418 includes an axially extending, inner cylindrical surface 420 in fluid-tight sealing engagement with an axial cylindrical seat wall 378 of retainer 370. It also includes a radially outer axially extending surface 422 in contact with ferrule 384 and a radially extending annular surface 424, which contacts radially annular portion 389 of ferrule 384.

Finger spring member 380 is nested within the single convolution defined by bellows 400 to provide the axial biasing force that causes the primary ring 320 to be urged toward mating ring 318. It includes a ferrule portion 382 associated with the flange 408 at primary ring 320, a ferrule portion 384 associated with the flange 418 at retainer 370. A plurality of spring fingers 386 connect ferrule portions 382 and 384. These spring fingers 386 are generally of a "U-shaped" cross-section.

Ferrule portion 382 includes a generally cylindrical axially extending portion 383 overlying flange 408 at surface 412 and a generally radially extending annular portion 385 adjacent radial outboard surface 416 of web 404.

Ferrule portion 384 includes a generally cylindrical portion 387 overlying flange 418 at surface 422 and a generally radially extending annular portion 389 adjacent radial inboard surface 424 of web 402.

Each spring finger 386 includes a relatively short radial leg portion 392 connected to ferrule 382, at radially annular portion 385 and a relatively long radial leg 394 connected to ferrule 384 at radial annular portion 389. The leg portions are joined at a radially inner bend portion 395.

Ferrule 382 is sized such that it applies a compressive force to axially extending annular flange 408 of web 404 to establish a fluid-tight relationship between the contacting surfaces of the ferrule 382 and flange 408 and the contacting surfaces of the flange 408 with primary ring 320.

Ferrule 384 is sized such that it applies a compressive force to axially extending annular flange 418 of web 402 to establish a fluid-tight relationship between the contacting surfaces of ferrule 384 and flange 418 and contacting surfaces of flange 418 and axially extending seat wall portion 378.

As with the first embodiment, a finger spring member 380 is nested within the single convolution of the bellows 400 to provide the axial biasing force that causes the primary ring 320 to be urged toward the mating ring 318. The finger spring member 380 can be the same as finger spring members 80 or 180 illustrated in FIGS. 1–6A.

The retainer 370 is located outboard of the bellows 400 and the finger spring member 380. The retainer 370 of this embodiment is similar to the retainer 70 of the embodiment of FIGS. 1–5 with the exception that the retainer 370 is shaped to provide for increased axial travel of the primary ring 320 and resultant axial compression of the spring fingers 386 of finger spring member 380.

The retainer 370 defines an outboard extending conical wall portion 379. Conical wall 379 is convex on its outboard surface and concave on its inboard surface adjacent bellows 400.

A curved wall portion 375a connects the conical wall portion 379 to a cylindrical wall portion 375. The cylindrical wall portion 375 extends for a given distance axially and is located radially inwardly of the outer surface of the inner base portion 406 of the bellows 400. The conical wall portion 379, the curved wall portion 375a and the cylindrical wall portion 375 are located outboard of the inner base 406 of the bellows 400 when the seal assembly is at its free height, as illustrated in FIG. 7.

At its working height, shown in FIG. 12, the spring 380 and the elastomeric bellows 400 cause the inner base portion 406 of the bellows 400 to shift in the outboard direction within the retainer 370 so that the outboard web 402 of bellows 400 comes into the contact with the concave conical surface of conical wall portion 379 of the retainer 370. The seal assembly components are positioned such that the spring fingers of spring 380 are compressed axially and provide a restoring force to urge the primary ring 320 into sealing contact with mating ring 318. The bellows web 402 is placed into contact with the inboard concave surface of conical wall 379 of retainer 370. The base 406 defining the connection between webs 402 and 404 of bellows 400 is displaced axially toward the conical wall portion 375 of retainer 370. The bellows outboard web 402 is thereby supported upon the concave surface of conical wall portion 379. Also, the conical shape of portion 379 and the curved transition wall 375a and cylindrical wall 375 provide a space within which the bellows 400 and its nested finger spring 380 reside when the seal 310 is at its operating or working height.

In the preloaded state, shown in FIG. 12, the leg 394 of spring finger 386 which connects to radial annular portion 389 of ferrule 384 is subject to greater axial deflection than the leg 392 connected to ferrule 382. This greater deflection results from the shape and configuration of the spring and also the radially extending annular surface 424 on flange 402, which provides for a separation between the spring finger 386 and radial wall surface of web 402.

Although the invention is described and illustrated with respect to several preferred embodiments, a general understanding of the invention provides the basis for other modifications and alterations which may become readily apparent to a person having ordinary skill in the art. For example, the preferred embodiments have been described and illustrated in the context of a retainer 70. However, it is considered possible to design a seal configuration utilizing a spring arrangement without a retainer, in which the bellows arrangement is held in place by frictional fit against the shaft or housing by a separate attachment (not shown) and to the primary ring by the spring ferrule, such as ferrule 82. Elimination of the retainer, and elimination of the sleeve, may be possible while still providing the benefits derived from the features of the present invention. Accordingly, described and illustrated embodiments above are not to be construed as limiting the scope of the invention.

What is claimed is:

1. A mechanical end face seal assembly to provide a fluid tight seal between a housing defining a bore and a rotatable shaft extending through the bore, said seal assembly comprising:

an annular mating seal ring;

an axially movable annular primary seal ring;

said rings each having a seal face in facing relation to the seal face of the other ring to define a sealing interface therebetween;

a resilient bellows in fluid-tight sealing relation to said primary ring and adapted to be in fluid-tight sealing relation to a housing or shaft;

said bellows including an inboard web and an outboard web;

a base connecting said webs to form a single convolution, a finger spring member adapted to urge said primary ring toward said mating seal ring, said finger spring member including a plurality of spring fingers adapted to be deformed on installation of said seal assembly between the housing and shaft; said finger spring being nested within said single convolution;

wherein a web of said bellows includes an axially extending annular flange in fluid-tight sealing engagement with said axially movable primary ring, and the other web includes an axially extending annular flange, and wherein said finger spring includes a ferrule connected to said inboard legs of said spring fingers, said ferrule being associated with said axially extending annular flange of said inboard web of said bellows, said finger spring further including a ferrule connected to said outboard legs of said spring fingers, said ferrule being associated with said axially extending annular flange on said outboard web of said bellows wherein said ferrules are sized to apply a compressive force to said associated axially extending annular flanges.

2. A mechanical end face seal assembly as claimed in claim 1 wherein said finger spring includes a plurality of generally U-shaped spring fingers having an inboard leg and an outboard leg adapted to be deformed on installation of said seal assembly between the housing and shaft.

3. A mechanical end face seal assembly as claimed in claim 2 wherein said webs of said bellows are generally radial and parallel to each other and said outboard radial web is longer than said inboard radial web, and said legs of said spring fingers are generally parallel to each other and said outboard leg is longer than said inboard leg.

4. A mechanical end face seal assembly as claimed in claim 2 wherein said assembly includes a sleeve, said sleeve including a resilient support and secondary seal molded thereto, said molded support and secondary seal is in fluid-tight contact with said mating ring.

5. A mechanical end face seal assembly as claimed in claim 4 wherein said molded resilient support and secondary seal includes an annular bead to seal said sleeve to said shaft.

6. A mechanical end face seal assembly as claimed in claim 4 wherein said mating ring includes drive notches and said molded support and secondary seal includes drive lugs engaging said drive notches.

7. A mechanical end face seal assembly as claimed in claim 4 wherein said mating ring includes drive notches and said sleeve includes drive dents engaging said drive notches of said mating ring and said resilient support and secondary seal includes an annular seat positioned within said mating ring to provide radial support therefor.

8. A mechanical end face seal assembly as claimed in claim 4 wherein said sleeve and retainer are interconnected to form a cartridge.

9. A mechanical end face seal as claimed in claim 2 wherein said spring is made of stainless steel and said bellows is an elastomer.

10. A mechanical end face seal assembly as claimed in claim 1 wherein said assembly includes a retainer to support said axially movable primary ring relative to the housing or shaft, said retainer including a cylindrical seat wall portion, and said axially extending flange of said outboard radial web is in fluid-tight sealing engagement with said axial cylindrical seal wall of said retainer.

11. A mechanical end face seal assembly as claimed in claim 10 wherein said retainer includes a generally radially extending curved wall portion, said curved wall portion adapted to support the outboard web of said bellows.

12. A mechanical end face seal assembly as claimed in claim 10 wherein said retainer includes a generally radially extending conical wall portion having an inboard concave surface to support the outboard web of said bellows.

13. A mechanical end face seal assembly as claimed in claim 10 wherein said axially extending annular flange on said outboard web includes an inner directed bead in sealing engagement with said cylindrical seat wall portion of said retainer.

14. A mechanical end face seal assembly as claimed in claim 10 wherein said assembly includes a sleeve, said sleeve including a resilient support and secondary seal molded thereto, said molded support and secondary seal is in fluid-tight contact with said mating ring.

15. A mechanical end face seal assembly as claimed in claim 14 wherein said molded resilient support and secondary seal includes an annular bead to seal said sleeve to said shaft and said retainer is adapted to connect said primary ring to said housing.

16. A mechanical end face seal assembly as claimed in claim 14 wherein said mating ring includes drive notches and said molded support and secondary seal includes drive lugs engaging said drive notches.

17. A mechanical end face seal assembly as claimed in claim 14 wherein said mating ring includes drive notches and said sleeve includes drive dents engaging said drive notches of said mating ring and said resilient support and secondary seal includes an annular seat positioned within said mating ring to provide radial support therefor.

18. A mechanical end face seal assembly as claimed in claim 17 wherein said sleeve and retainer are interconnected to form a cartridge.

19. A mechanical end face seal as claimed in claim 17 wherein said spring is made of stainless steel and said bellows is an elastomer.

20. A mechanical end face seal assembly as claimed in claim 14 wherein said sleeve and retainer are interconnected to form a cartridge.

21. A mechanical end face seal assembly as claimed in claim 20 wherein said assembly includes a retainer to support said axially movable primary ring relative to the housing or shaft, and said retainer includes a generally radially extending concical wall portion having an inboard concave surface to support the outboard web of said bellows.

22. A mechanical end face seal assembly to provide a fluid tight seal between a housing defining a bore and a rotatable shaft extending through the bore, said seal assembly comprising:

an annular mating seal ring;
an axially movable annular primary seal ring;
said rings each having a seal face in facing relation to the seal face of the other ring to define a sealing interface therebetween;
a resilient bellows in fluid-tight sealing relation to said primary ring and adapted to be in fluid-tight sealing relation to a housing or shaft;
said bellows including an inboard web and an outboard web;
a base connecting said webs to form a single convolution,
a finger spring member adapted to urge said primary ring toward said mating seal ring, said finger spring member including a plurality of spring fingers adapted to be deformed on installation of said seal assembly between the housing and shaft;
said finger spring being nested within said single convolution;
wherein said finger spring includes a plurality of generally U-shaped spring fingers having an inboard leg and an outboard leg adapted to be deformed on installation of said seal assembly between the housing and shaft; and
wherein said inboard radial web of said bellows includes an axially extending annular flange in fluid-tight sealing engagement with said axially movable primary ring, and said outboard radial web includes an axially extending annular flange and wherein said finger spring includes a ferrule connected to said inboard legs of said spring fingers, said ferrule being associated with said axially extending annular flange of said inboard web of said bellows, said finger spring further including a ferrule connected to said outboard legs of said spring fingers, said ferrule being associated with said axially extending annular flange on said outboard web of said bellows; and wherein each said ferrule includes a cylindrical axially extending portion overlying said axially extending annular flange of one of said webs and a radially extending annular portion adjacent said web, the leg portions of said spring fingers behind connected to said ferrules at said one of said cylindrical axially extending portion and said radially extending annular portion of said ferrules.

23. A mechanical end face seal assembly as claimed in claim 22 wherein the radially extending annular portion of said ferrule associated with said axially extending annular flange of said inboard web of said bellows defines slots separating said radially extending annular portion of said ferrule from said inboard legs of said spring fingers.

24. A mechanical end face seal assembly as claimed in claim 23 wherein the radially extending annular portion of said ferrule associated with said axially extending annular flange of said outboard web of said bellows defines slots separating said radially extending annular portion of said ferrule from said outboard legs of said spring fingers.

25. A mechanical end face seal assembly as claimed in claim 22 wherein said inboard legs of said spring fingers are connected only to said cylindrical axially extending portion of said ferrule associated with said axially extending annular flange of said inboard radial web of said bellows and said outboard legs of said spring fingers are connected to said radially extending annular portion of said ferrule associated with said axially extending annular flange of said outboard radial web of said bellows.

26. A mechanical end face seal assembly as claimed in claim 25 wherein said axially extending flange on said outboard web of said bellows includes a radial inboard surface in contact with the radially extending annular portion of said ferrule associated with said flange of said outboard web to position said outboard legs of said spring fingers in spaced relation to said outboard web of said bellows.

27. A mechanical end face seal assembly as claimed in claim 26 wherein on deformation of said spring fingers, said outboard legs of said spring fingers are subject to greater deflection than said inboard legs.

28. A mechanical end face seal assembly as claimed in claim 25 wherein said cylindrical axially extending portions of said ferrules apply radial compressive forces to said axially extending annular flanges of said webs.

29. A mechanical end face seal assembly as claimed in claim 25 wherein said assembly includes a retainer to support said axially movable primary ring relative to the housing or shaft, said retainer including a cylindrical seat wall portion, and said axially extending flange of said outboard radial web is in fluid-tight sealing engagement with said axial cylindrical seal wall of said retainer.

30. A mechanical end face seal assembly as claimed in claim 29 wherein said retainer includes a generally radially extending curved wall portion, said curved wall portion adapted to support the outboard web of said bellows.

31. A mechanical end face seal assembly as claimed in claim 29 wherein said retainer includes a generally radially extending conical wall portion having an inboard concave surface to support the outboard web of said bellows.

32. A mechanical end face seal assembly as claimed in claim 29 wherein said axially extending annular flange on said outboard web includes an inner directed bead in sealing engagement with said cylindrical seat wall portion of said retainer.

33. A mechanical end face seal assembly as claimed in claim 25 wherein said assembly includes a retainer to support said axially movable primary ring relative to the housing or shaft, and said retainer includes a generally radially extending conical wall portion having an inboard concave surface to support the outboard web of said bellows.

34. A mechanical end face seal as claimed in claim 25 wherein said spring is made of stainless steel and said bellows is an elastomer.

35. A mechanical end face seal assembly as claimed in claim 22 wherein said axially extending flange on said outboard web of said bellows includes a radial inboard surface in contact with the radially extending annular portion of said ferrule associated with said flange of said outboard web to position said outboard legs of said spring fingers in spaced relation to said outboard web of said bellows.

36. A mechanical end face seal assembly as claimed in claim 35 wherein on deformation of said spring fingers, said outboard legs of said spring fingers are subject to greater deflection than said inboard legs.

37. A mechanical end face seal assembly as claimed in claim 36 wherein said assembly includes a retainer to support said axially movable primary ring relative to the housing or shaft, and said retainer includes a generally radially extending conical wall portion having an inboard concave surface to support the outboard web of said bellows.

38. A mechanical end face seal assembly as claimed in claim 35 wherein said assembly includes a retainer to support said axially movable primary ring relative to the housing or shaft, and said retainer includes a generally radially extending conical wall portion having an inboard concave surface to support the outboard web of said bellows.

39. A mechanical end face seal as claimed in claim 35 wherein said spring is made of stainless steel and said bellows is an elastomer.

40. A mechanical end face seal assembly as claimed in claim 22 wherein said cylindrical axially extending portions of said ferrules apply radial compressive forces to said axially extending annular flanges of said webs.

41. A mechanical end face seal assembly as claimed in claim 40 wherein said assembly includes a retainer to support said axially movable primary ring relative to the housing or shaft, and said retainer includes a generally radially extending conical wall portion having an inboard concave surface to support the outboard web of said bellows.

42. A mechanical end face seal assembly as claimed in claim 22 wherein said assembly includes a retainer to support said axially movable primary ring relative to the housing or shaft, and said retainer includes a generally radially extending conical wall portion having an inboard concave surface to support the outboard web of said bellows.

43. A mechanical end face seal as claimed in claim 22 wherein said spring is made of stainless steel and said bellows is an elastomer.

44. A mechanical end face seal assembly to provide a fluid tight seal between a housing defining a bore and a rotatable shaft extending through the bore, said seal assembly comprising:
   an annular mating seal ring;
   an axially movable annular primary seal ring;
   said rings each having a seal face in facing relation to the seal face of the other ring to define a sealing interface therebetween;
   a resilient bellows in fluid-tight sealing relation to said primary ring and adapted to be in fluid-tight sealing relation to a housing or shaft;
   said bellows including an inboard web and an outboard web;

a base connecting said webs to form a single convolution, a finger spring member adapted to urge said primary ring toward said mating seal ring, said finger spring member including a plurality of spring fingers adapted to be deformed on installation of said seal assembly between the housing and shaft;

said finger spring being nested within said single convolution;

wherein said finger spring includes a plurality of generally U-shaped spring fingers having an inboard leg and an outboard leg adapted to be deformed on installation of said seal assembly between the housing and shaft; and wherein said webs of said bellows are generally radial and parallel to each other and said outboard radial web is longer than said inboard radial web, and said legs of said spring fingers are generally parallel to each other and said outboard leg is longer than said inboard leg; and wherein said inboard radial web of said bellows includes an axially extending annular flange in fluid-tight sealing engagement with said axially movable primary ring, and said outboard radial web includes an axially extending annular flange and wherein said finger spring includes a ferrule connected to said inboard legs of said spring fingers, said ferrule being associated with said axially extending annular flange of said inboard web of said bellows, said finger spring further including a ferrule connected to said outboard legs of said spring fingers, said ferrule being associated with said axially extending annular flange on said outboard web of said bellows; and wherein each said ferrule includes a cylindrical axially extending portion overlying said axially extending annular flange of one of said webs and a radially extending annular portion adjacent said web, the leg portions of said spring fingers being connected to said ferrules at said one of said cylindrical axially extending portion and said radially extending annular portion of said ferrules.

45. A mechanical end face seal assembly as claimed in claim 44 wherein the radially extending annular portion of said ferrule associated with said axially extending annular flange of said inboard web of said bellows defines slots separating said radially extending annular portion of said ferrule from said inboard legs of said spring fingers.

46. A mechanical end face seal assembly as claimed in claim 45 wherein the radially extending annular portion of said ferrule associated with said axially extending annular flange of said outboard web of said bellows defines slots separating said radially extending annular portion of said ferrule from said outboard legs of said spring fingers.

* * * * *